Figures 1, 13, 14:
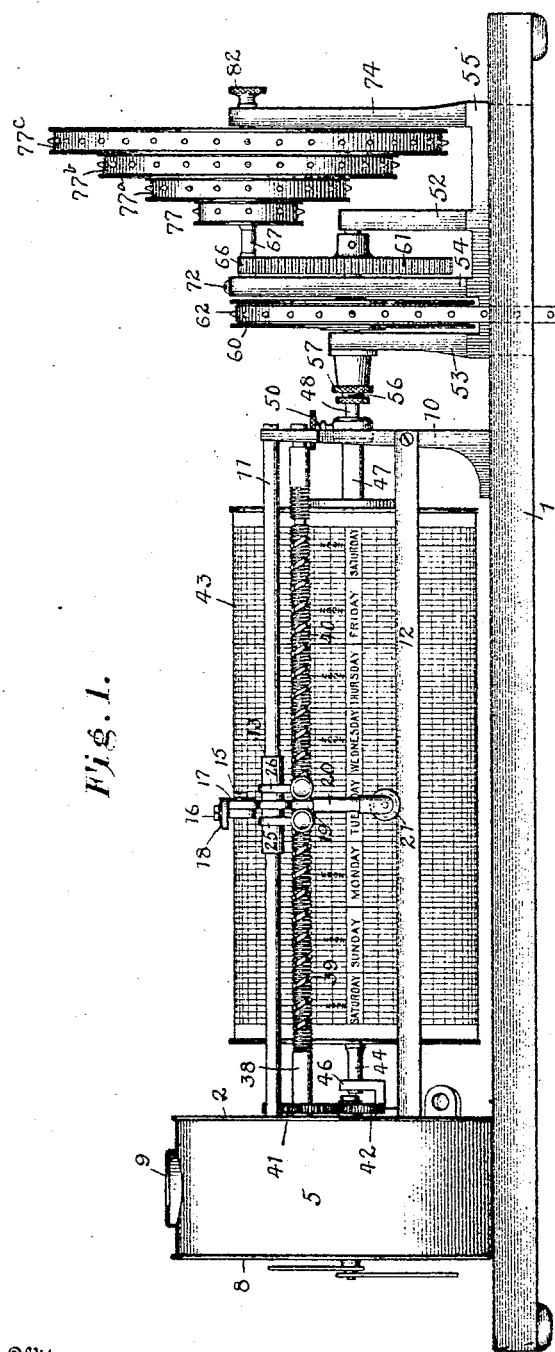

No. 776,315. PATENTED NOV. 29, 1904.
J. P. FRIEZ.
AUTOMATIC WATER STAGE RECORDER.
APPLICATION FILED NOV. 25, 1903.
NO MODEL. 3 SHEETS—SHEET 1.

Witnesses
Chas. A. Ford
Ida J. Ford

Inventor
Julien P. Friez.
By S. Brashears
Attorney

No. 776,315. PATENTED NOV. 29, 1904.
J. P. FRIEZ.
AUTOMATIC WATER STAGE RECORDER.
APPLICATION FILED NOV. 25, 1903.
NO MODEL. 3 SHEETS—SHEET 2.
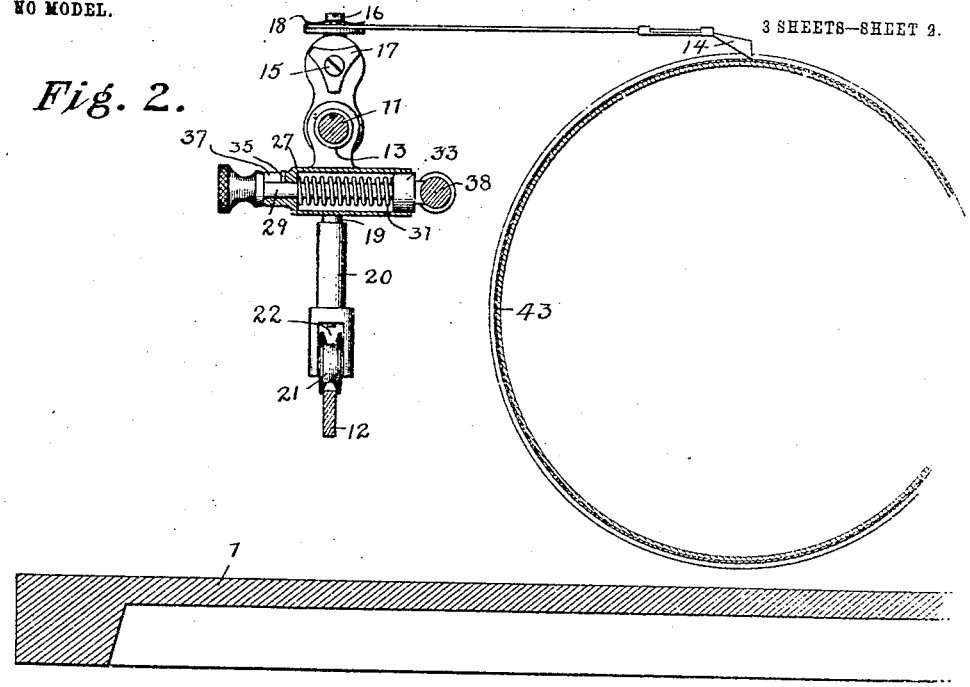
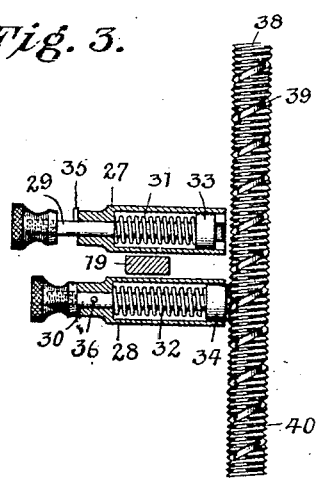
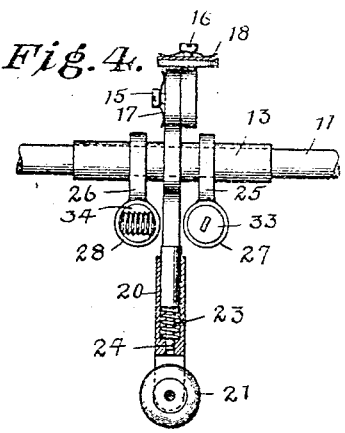
Witnesses
Chas. A. Ford
Ida J. Ford
Inventor
Julien P. Friez.
By S. Brashears
Attorney

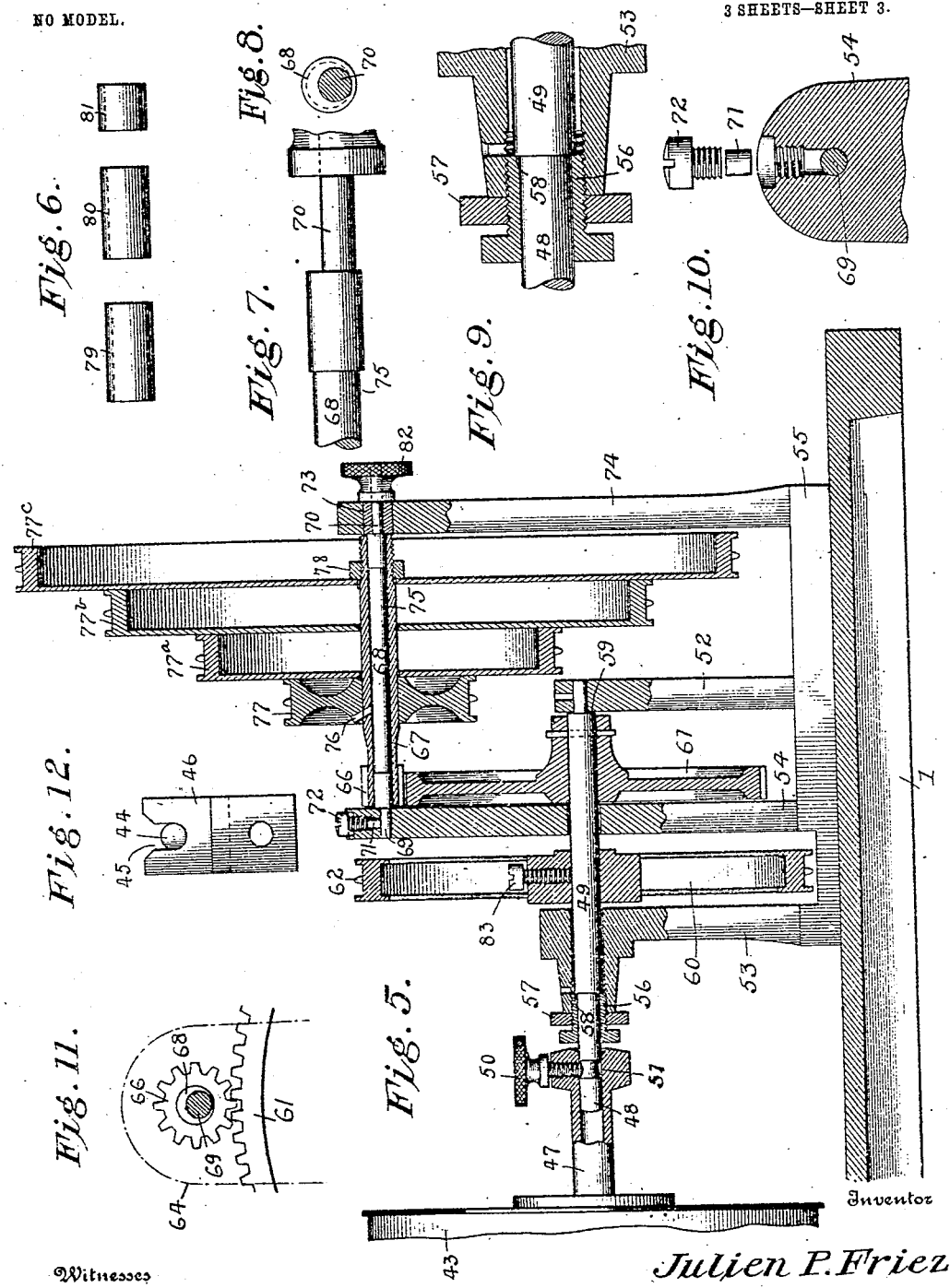

No. 776,315.

Patented November 29, 1904.

UNITED STATES PATENT OFFICE.

JULIEN P. FRIEZ, OF BALTIMORE, MARYLAND.

AUTOMATIC WATER-STAGE RECORDER.

SPECIFICATION forming part of Letters Patent No. 776,315, dated November 29, 1904.

Application filed November 25, 1903. Serial No. 182,663. (No model.)

*To all whom it may concern:*

Be it known that I, JULIEN P. FRIEZ, a citizen of the United States, residing at Baltimore, in the State of Maryland, have invented certain new and useful Improvements in Automatic Water-Stage Recorders, of which the following is a specification.

This invention relates generally to automatic water-stage recorders or recording water-gages designed to measure and record automatically and continuously the variations in the height of water or other liquids in tanks, streams, flumes, irrigating-ditches, reservoirs, &c., and more particularly to that class of such gages of which a specimen is described and claimed in a prior patent, numbered 681,536, granted to me on the 27th day of August, A. D. 1901. The recorder described in said patent comprises a horizontal cylinder arranged to rotate in opposite directions through the medium of a counterpoised float resting upon the surface of the body of water, the height variations of which are to be measured and recorded, the rise and fall of said float actuating a perforated tape connected to the float and its counterpoising weight and passing over a sprocket-wheel connected with the cylinder, a pen or pencil resting upon a sheet of record-paper covering the cylinder being fed or moved continuously along the length of the cylinder by means of a feed-screw actuated by a suitable motor, such as clockwork.

In the practical use of this recorder certain improvements in the details of construction have suggested themselves to me; and the objects of this invention are to improve the mechanisms of the recorder—to wit, the guiding and feeding mechanism for the recording-pen, the shaft connection with the cylinder, the arrangement of the sprocket-wheels, the gearing of shafts, the endwise adjustment of the cylinder-shaft, and the clockwork-motor case.

With these objects in view the invention consists in the improved construction, arrangement, and combination of parts hereinafter fully described and afterward specifically claimed.

In the accompanying drawings, which illustrate a recorder embodying my present invention, Figure 1 represents a view thereof in side elevation; Fig. 2, a sectional view on a vertical plane cutting transversely through the pen-carriage, feed-screw, guide-rod, and cylinder; Fig. 3, a horizontal sectional view of the pen-carriage at the level of the feed-screw, part of the latter being shown in plan; Fig. 4, a detail view showing the inner side of the pen-carriage in elevation, with the pen and pen-carriage guide in section; Fig. 5, a vertical longitudinal sectional view of the gearing, sprocket-weeels, and shafts, the frame and part of the cylinder being shown in elevation; Fig. 6, an elevation of the sleeves for securing the sprocket-wheels on the shaft; Fig. 7, an elevation of part of the gear-regulating shaft; Fig. 8, a section through the same; Fig. 9, a section through the cylinder-shaft-adjusting devices; Fig. 10, a section through the gear-regulating shaft and bearing with the holding plug and screw ready for insertion; Fig. 11, a section through the counter-shaft alongside the gears; Fig. 12, a view of the open bearing of the cylinder-shaft; Fig. 13, a sectional view through the clockwork-motor case, and Fig. 14 a face view of the motor-case and clock.

Like reference characters mark the same parts wherever they occur in more than one figure of the drawings.

Referring specifically to the drawings, 1 indicates the base, upon which is mounted the motor, in this instance clockwork, the case of which comprises a rear plate 2, which supports all of the motor mechanism, including the face 3 and the hands, a front plate 4, and inclosing rim 5, the front plate and rim being preferably rigidly secured together and removably secured to the rear plate by means of pillars 6 and screws 7, as clearly shown in Fig. 13, whereby said front and rim may be readily and quickly removed, thus exposing the works for cleaning or repair without in any wise disturbing them. The front plate is provided with an opening 8 for exposing the face and the rim with a glazed inspection-opening 9, as shown in Figs. 13 and 14.

Upon the base 1 is erected a standard 10, which supports one end of a cylindrical rod 11 and one end of a rectangular rod 12, these rods being in a single vertical plane parallel with the cylinder-shaft and supported at their opposite ends by the rear plate of the motor-case. The pen-carriage is supported and guided upon the rods 11 and 12 and comprises a tubular body 13, which fits snugly on rod 11 and carries the pen 14; the latter being pivotally and adjustably mounted on horizontal and vertical pivot-screws 15 and 16 and held in any adjustment by friction-springs 17 18 in the manner described in my prior patent. Depending from the mid-length of the tubular body 13 is a rod 19, upon which is loosely fitted a sleeve 20, bifurcated at its lower end and carrying a friction-roller 21, having an annular groove 22, substantially semicylindrical in cross-section and adapted in use to straddle the rectangular rod 12, (see Fig. 2,) contacting with said rod only at its upper corners, whereby freedom of movement thereon is secured without sacrificing the special function of the roller, which is to prevent lateral oscillation of the tubular body 13 on the cylindrical rod 11. The roller is kept in yielding contact with rod 12 by a spring 23 in the sleeve 20, coiled around a reduced extension 24 of rod 19.
Depending from the tubular body 13 on each side of the rod 19 are brackets 25 26, supporting at their lower ends horizontal parallel sleeves 27 28, lying at right angles to the body and having reduced bores in their outer ends in which are slidably and rotatably mounted rods 29 30, normally pressed inward by springs 31 32, coiled about the rods and bearing against heads 33 34, which have on their outer faces screw-threads, hereinafter described. The rods 29 and 30 are provided with laterally-projecting pins 35 36, which are normally seated in longitudinal slots in the sleeves, (one of which is shown at 37 in Fig. 2,) but which may be turned aside to engage the end of the sleeve when it is withdrawn from the slot by withdrawing the rods to hold the rods and heads in their outer positions, in which positions the rod 29 is shown in Fig. 3.
At 38 is shown the feed-screw, which is rotatably mounted at one end in the standard 10 and at the other end in the rear plate 2 of the motor-case, the screw being parallel with rods 11 and 12 and provided with two threads 39 40, running in the same direction, but of different pitches to correspond with the pitches of the threads of the heads 33 and 34, which respectively engage the threads 39 and 40 when the heads are in their inner positions.
In this instance the pitch of the thread 39 is one-seventh of that of the thread 40, and the latter is in the form of a spiral groove cutting obliquely through the former. The head 33 is provided with a single thread traveling in the groove, while the head 34 has a number of threads, whereby their engagement with the threads 40 is uninterrupted by the spiral groove or thread 39.

The feed-screw is rotated continuously in one direction by means of a gear-wheel 41, which meshes with a gear-wheel 42, driven by the motor, and the heads 33 and 34 act as nut-sections, whereby the pen-carriage is driven during the rotation of the feed-screw so long as either of the threads of the heads engage the threads of the screw. When the head 33 is engaged with thread 39, the pen-carriage will be moved the length of the cylinder in one day; but when head 34 is engaged with thread 40 the pen-carriage will be moved the length of the cylinder in a week.

The cylinder is indicated at 43, supported at its inner end by a stub-shaft 44, journaled in an open bearing 45 in a bracket 46, secured to plate 2 of the motor-case (see Figs. 1 and 12) and provided at its outer end with a hollow stub-shaft or sleeve 47, fitting down over the reduced end 48 of a shaft 49 and adapted to be secured thereon by a set-screw 50, engaging in an annular groove 51 in the shaft, Fig. 5. The cylinder carries a record-sheet secured around it, as shown in Fig. 1, and as the feed-screw rotates the pen is moved longitudinally along on the record-sheet, leaving a record-mark. The record-sheet shown in Fig. 1 is a weekly sheet and is intended for use when head 34 engages thread 40 and the pen-carriage takes a week to travel from one end to the other; but when head 33 is engaged with thread 39 a daily sheet will be used.

The shaft 49 is journaled at one end in a bearing in a standard 52 and passes loosely through openings in standards 53 and 54, the standards being rigidly secured to or forming part of a plate 55, resting on the base 1, the opening in standard 53 being threaded to receive a threaded sleeve 56, which fits over the reduced end 48 and forms the bearing for that end of the shaft. A jam-nut 57 is provided on the sleeve 56. The cylinder may be adjusted slightly endwise by screwing the sleeve 56 up against the shoulder 58, formed at the junction of the reduced end 48 with the shaft 49, Figs. 5 and 9, and this action also forces a shoulder 59 on the shaft close up to the bearing in standard 52, so that endwise slip of the shaft or of the cylinder, the sprocket-wheel 60, and gear 61, secured to the shaft, is absolutely prevented and absolutely true turning of the parts assured, the jam-nut holding the parts in their adjusted positions.

Over the sprocket-wheel 60 and engaged on the pins 62 projecting therefrom is passed a perforated flexible metal tape 63, which passes downward on each side through slots in the base (shown in dotted lines in Fig. 1) and has secured at one end a float 64 and at the other a counterbalancing-weight 65. The float rests on the surface of the water, and as it is raised up and down by the rise and fall of the water the cylinder is rotated back and forth, causing the pen in its rectilinear movement to describe a wavy record-line on the sheet, thus indicating on a properly-ruled sheet the true stage of the water at any and all times.

The sprocket-wheel 60 being of the same diameter as the cylinder and directly connected thereto, the surface of the cylinder will be rotated exactly the distance the water rises and falls; but as it is sometimes desirable to vary this proportion the shaft 49 is provided with the gear-wheel 61, which meshes with a pinion 66 on a sleeve 67, journaled on a shaft 68, provided with reduced ends 69 70, arranged in line with each other, but eccentric to the shaft, the end 69 resting in a bearing in standard 54 and adapted to be secured therein by means of a plug 71 and screw 72 (see Figs. 5 and 10) and the end 70 being projected through a bushing or bearing in a sleeve 73 in a standard 74 rising from plate 55, the shaft 68 being of less diameter in its intermediate portion, so that sleeve 67 bears only at the ends, and an oil-chamber 75 is formed, to which access is had through a suitable oil-duct 76, partially in the sleeve and partially in a small sprocket-wheel 77, all of such mechanisms being illustrated in detail in Figs. 5, 7, 8, 10, and 11. The pinion 66 and gear-wheel 61 may be of any desired relative diameters, so that the cylinder-shaft may be rotated as slowly as may be desired with relation to the rotation of the counter-shaft, and the amount of rotation of the cylinder with relation to the rise and fall of the water may be further varied by the use of a number of sprocket-wheels on the counter-shaft, as shown at 77$^a$, 77$^b$, and 77$^c$ in Figs. 1 and 5, arranged in the form of the well-known cone-pulleys, such sprocket-wheels being of definite relative diameter in comparison with the main sprocket-wheel and the cylinder. The sprocket-wheel 77 is rigidly secured against movement to the left on the sleeve-shaft, and when the other sprocket-wheels are placed in position they are held by means of a nut 78 bearing against the wheel 77$^c$, as seen in Fig. 5.

When it is desired to use only the sprocket-wheel 77, a sleeve 79, Fig. 6, is placed on the sleeve-shaft between the sprocket-wheel and the nut 78. When the sprocket-wheel 77$^a$ is added, the sleeve 80 is used, and when sprocket-wheel 77$^b$ is also added the sleeve 81 is used in the same position. If desired, either one of the sprocket-wheels 77$^a$, 77$^b$, or 77$^c$ may be used with the sprocket-wheel 77 by using the proper sleeve.

The provision of the eccentric ends 69 and 70 on shaft 68 is for the purpose of adjusting the engagement of the pinion 66 with the gear 77. By loosening the screw 72 and turning the shaft by means of the head 82 thereon the depth to which the teeth of the pinion will enter between those of the gear-wheel, Figs. 5 and 11, will be adjusted with the greatest accuracy and all lost motion, rattle, or inaccuracy in the running will be effectually prevented.

To remove the sleeve-shaft 67 and all of its wheels from the machine, it is only necessary to loosen the screw 72 and withdraw shaft 68 and sleeve 73 through the bearing in standard 74. To remove the cylinder 43, it is only necessary to loosen screw 50, slide the cylinder with stub-shaft 47 off the end of shaft 48, and lift the stub-shaft 44 out of the open bearing 45 in bracket 46.

By slightly loosening the screw 50 the cylinder may be adjusted on its axis to properly position it and the record-sheet thereon with relation to the pen without affecting the float. This loosening of the screw 50 will also prevent the cylinder from turning with shaft 49, if desired.

The sprocket-wheel 60 is secured on shaft 49 by set-screw 83.

While I have specifically described the construction and arrangement of the various parts, it will be obvious to those skilled in the art that many slight changes and variations therefrom might be made without departing from the spirit and scope of my invention.

Having thus described my invention, what I claim as new, and desire to secure by Letters Patent of the United States, is—

1. In a water-stage recorder, the combination of a cylindrical supporting-rod, a pen-carriage, a sleeve on the pen-carriage slidably and rotatably mounted on said rod, a feed-screw, a threaded head on the carriage engaging the screw, a guide-rod below and parallel with the supporting-rod, a rod projecting downwardly from the pen-carriage, and a roller carried by said projecting rod and engaging the guide-rod in a manner to prevent lateral movement thereon substantially as described.

2. In a water-stage recorder, the combination of a cylindrical supporting-rod, a pen-carriage, a sleeve on the pen-carriage slidably and rotatably mounted on said rod, a feed-screw, a threaded head on the carriage engaging the screw, a guide-rod below and parallel with the supporting-rod, a rod projecting downwardly from the pen-carriage, and a grooved roller carried by said projecting rod and straddling the angular guide-rod, substantially as described.

3. In a water-stage recorder, the combination of a cylindrical supporting-rod, a pen-carriage, a sleeve on the pen-carriage slidably and rotatably mounted on said rod, a feed-screw, a threaded head on the carriage engaging the screw, a guide-rod below and parallel with the supporting-rod, a rod projecting downwardly from the pen-carriage, and a spring-backed grooved roller carried by said projecting rod and straddling and yieldingly engaging the guide-rod, substantially as described.

4. In a water-stage recorder, the combination of a cylindrical supporting-rod, a pen-carriage, a sleeve on the pen-carriage slidably and rotatably mounted on said rod, a feed-screw, a threaded head on the carriage engaging the screw, a guide-rod angular in cross-section below and parallel with the supporting-rod, a rod projecting downwardly from the pen-carriage, and a spring-backed grooved roller carried by said projecting rod and straddling and yieldingly engaging only the corners thereof, substantially as described.

5. In a water-stage recorder, the combination of a horizontal cylinder, a supporting-rod, a pen-carriage comprising a tubular body slidably and rotatably mounted thereon, a guide-rod angular in cross-section mounted below and parallel with the guide-rod, a tubular bracket depending from the pen-carriage, a rod slidably arranged therein, a pulley carried by the last-named rod provided with a groove substantially semicylindrical in cross-section, and a spring for yieldingly holding the pulley astraddle of the guide-rod in contact with its corners only, substantially as described.

6. In a water-stage recorder, the combination of a feed-screw with a plurality of threads of different pitches running in the same direction, a supporting-rod, a pen-carriage comprising a tubular body slidably mounted on said rod, and a plurality of heads carried by the pen-carriage having threads of proper pitches to engage the respective threads of the feed-screw, substantially as described.

7. In a water-stage recorder, the combination of a feed-screw provided with a regularly-cut thread, and a second thread of greater pitch running in the same direction and consisting of a groove cutting through the first-named threads, a pen-carriage, a head thereon with a number of threads corresponding to the first-named thread, a second head on the carriage provided with a plate or single thread to fit in the spiral groove, and means for causing either head to be engaged with its respective thread, substantially as described.

8. In a water-stage recorder, the combination of a main shaft journaled in two bearings and projecting beyond one of them, an open bearing in the same line, a record-cylinder, a stub-shaft on one end thereof journaled in the open bearing, a stub-shaft on the other end of the cylinder, and means for slidably and removably connecting the last-named stub-shaft with the main shaft, substantially as described.

9. In a water-stage recorder, the combination of a main shaft journaled in two bearings at different points of its length and projecting beyond one of said bearings, an open bearing in line with said bearings, a record-cylinder, a stub-shaft on one end thereof journaled in the open bearing, a sleeve stub-shaft on the other end of the cylinder slidably mounted on the projecting end of the main shaft, and means for removably securing it thereon, substantially as described.

10. In a water-stage recorder, the combination of a main shaft journaled in two bearings at different points in its length and projecting beyond one bearing and provided in the projection with an annular groove, a record-cylinder provided on one end with a sleeve stub-shaft embracing the end of the main shaft, and a set-screw threaded through the sleeve stub-shaft and bearing in the annular groove in the main shaft, substantially as described.

11. In a water-stage recorder, the combination of two standards having alined openings one of which is interiorly threaded, a main shaft journaled in one opening and passing loosely through the other with a reduced end partly in and projecting beyond the threaded opening forming a shoulder on the shaft, a sleeve bearing upon the shaft threaded into the threaded opening and adapted to bear against the shoulder, and a record-cylinder secured to the projecting end of the shaft, substantially as described.

12. In a water-stage recorder, the combination of a main shaft carrying a gear-wheel, a second shaft parallel with the main shaft mounted in bearings and eccentrically adjustable therein, means for fixing the second shaft in any adjustment, a sleeve-shaft turnable on the second shaft, and a pinion on the sleeve-shaft always in mesh with the gear-wheel, substantially as described.

13. In a water-stage recorder, the combination of a shaft having eccentrically-arranged reduced ends, a bearing, a cylindrical sleeve in the bearing on one reduced end of the shaft, a bearing for the other reduced end, means for turning the shaft on said reduced ends, means for securing it in any position, a sleeve on the shaft, a pinion on the sleeve, a main shaft, and a gear-wheel continuously in mesh with the pinion, substantially as described.

In testimony whereof I affix my signature in presence of two witnesses.

JULIEN P. FRIEZ.

Witnesses:
  A. O. BABENDREIER,
  MURRAY HANSON.